March 3, 1953 A. W. BAXTER 2,629,960
FISHING LURE
Filed April 17, 1951
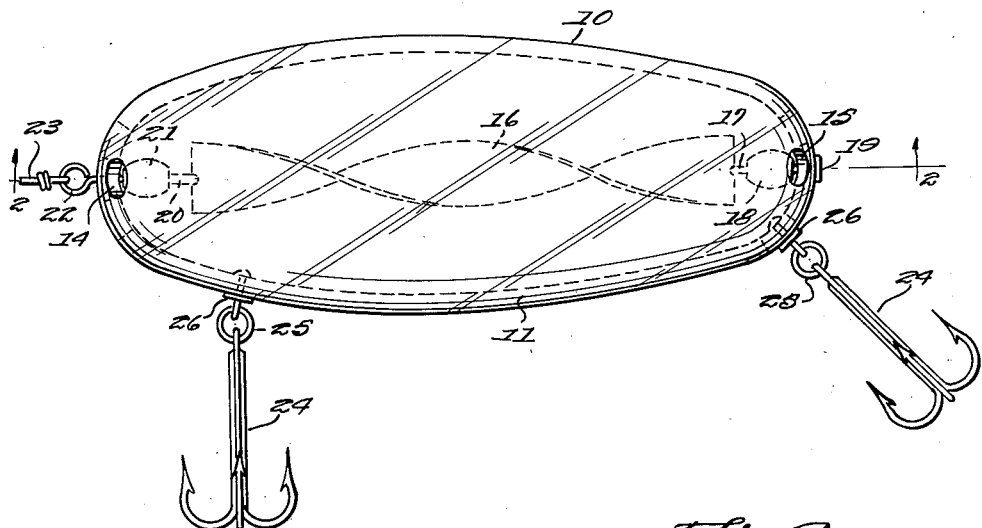
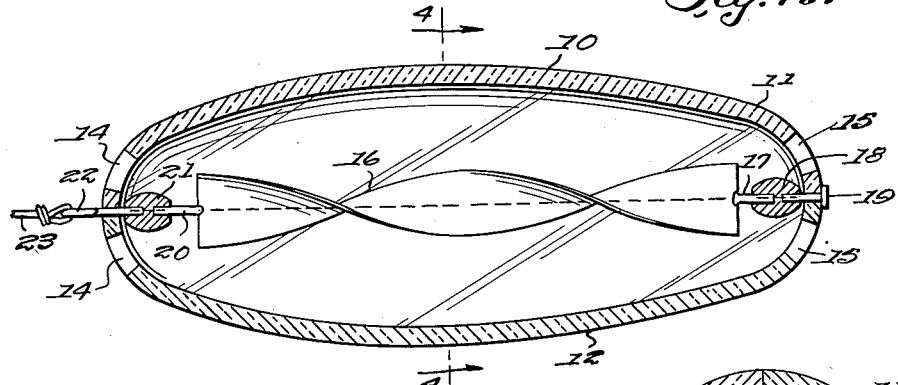
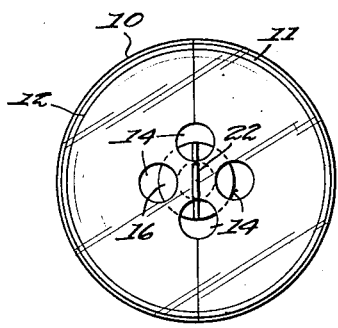
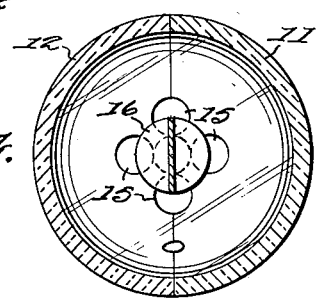
INVENTOR.
Albert W. Baxter,
BY Victor J. Evans & Co.
ATTORNEYS Patented Mar. 3, 1953

2,629,960

UNITED STATES PATENT OFFICE 2,629,960

FISHING LURE

Albert W. Baxter, Hollywood, Calif.

Application April 17, 1951, Serial No. 221,490

1 Claim. (Cl. 43—42.06)

This invention relates to an artificial fish lure or bait.

The object of the invention is to provide a fish lure which includes a rotatable member that is encased in a transparent body, whereby when the body is drawn through the water, the member will rotate or spin to thereby attract fish.

Another object of the invention is to provide a fish lure which comprises a body fabricated of a transparent material provided with openings therein, whereby water will pass through the body as the lure is drawn through the water to rotate the inner rotator so that fish will be lured or attracted thereto.

A further object of the invention is to provide a fish lure which is extremely simple and inexpensive to manufacture.

Other objects and advantages will be apparent during the course of the following description.

In the accompanying drawings forming a part of this application, in which like numerals are used to designate like parts throughout the same:

Figure 1 is a side elevational view of the fish lure constructed according to the present invention;

Figure 2 is a sectional view taken on the line 2—2 of Figure 1, the rotator and supporting pins therefor being shown in full;

Figure 3 is a front elevational view of the fish lure of the present invention;

Figure 4 is a sectional view taken on the line 4—4 of Figure 2.

Referring in detail to the drawings, the numeral 10 designates a body which may be fabricated of a suitable transparent material, such as a transparent plastic, and the body 10 includes a pair of similar sections 11 and 12 which are secured together, Figure 4. The body 10 is hollow, and arranged in the front end of the body 10 is a plurality of spaced openings 14 for the ingress therethrough of water. The rear end of the body 10 is provided with a plurality of spaced holes or openings 15 for the passage therethrough of water as the lure is drawn through the water.

Extending longitudinally within the body 10 for a portion of its length is a rotator or spinning twisted member 16 which may be made of a piece of twisted metal that has a bright finish or bright color thereon. The rotatable member 16 has a pin or trunnion 17 projecting from its rear end, and the pin 17 is rotatably connected to a bearing 18, there being a pin 19 connecting the bearing 18 to the rear of the body 10.

A pin or trunnion 20 is secured to the front end of the rotatable member 16, and a bearing 21 is rotatably connected to the trunnion 20 and connects an eyelet 22 to the pin 20. The eyelet 22 is adapted to be connected to a conventional fishing line 23, so that the fish lure of the present invention can be readily drawn through the water.

Dependingly carried by the body 10 is a plurality of fishhook assemblies 24. Each of the fishhook assemblies 24 comprises a ring 25 which is connected to a bearing 26 which may be secured in any suitable manner to the body 10.

In use, the lure of the present invention is pulled through the water by means of the fishing line 23. As the lure is pulled through the water, water will enter the interior of the hollow transparent body 10 through the openings 14. This water will then flow through the body 10 and out through the openings 15 in the rear end of the body. As the water flows through the interior of the body, the member 16 will spin or rotate and this will attract or lure fish thereto, so that the fishhooks 24 will be engaged by the fish.

The lure of the present invention is made in any size or shape, and the lure can be used in various types of fishing, such as trolling. The inner rotatable member 16 may be made of twisted metal or plastic or other material, and can be polished or colored, or can have a luminous coating thereon. Further, the member 16 may have a highly reflecting surface thereon and the twist in the member 16 causes it to rotate or spin, whereby the lure will have a lifelike appearance.

What is claimed is:

A fish lure comprising an elongated transparent hollow body including a pair of similar sections connected together along their meeting edges and the body having a plurality of spaced openings arranged in the front and the rear ends thereof to permit the passage of water through said body, a pin projecting through each of said ends, a bearing connected to each of said pins, an elongated twisted member extending longitudinally within said body, trunnions at the opposite ends of said member journaled in said bearings whereby the passage of water through said body will cause rotation of said member, an eyelet connected to the pin in the front end of said body adapted to be connected to a fish line, and a plurality of fish hooks carried by said body.

ALBERT W. BAXTER.

REFERENCES CITED

The following references are of record in the file of this patent:

UNITED STATES PATENTS

| Number | Name | Date |
|---|---|---|
| 489,110 | Welch | Jan. 3, 1893 |
| 810,822 | Tinkess | Jan. 23, 1906 |
| 990,984 | Immell | May 2, 1911 |
| 1,470,842 | Hyams | Oct. 16, 1923 |
| 2,106,755 | McArthur | Feb. 1, 1938 |
| 2,127,761 | Beck | Aug. 23, 1938 |
| 2,517,620 | Anderson | Aug. 8, 1950 |
| 2,530,008 | Fey | Nov. 14, 1950 |

FOREIGN PATENTS

| Number | Country | Date |
|---|---|---|
| 829,511 | France | June 29, 1938 |